UNITED STATES PATENT OFFICE.

IWAN OSTROMISLENSKY, OF PETROGRAD, RUSSIA, ASSIGNOR, BY MESNE ASSIGNMENTS, TO NEW YORK BELTING AND PACKING COMPANY, A CORPORATION OF NEW YORK.

PROCESS FOR VULCANIZING RUBBER AND PRODUCTS OBTAINED THEREBY.

1,320,166.     Specification of Letters Patent.     Patented Oct. 28, 1919.

No Drawing. Original application filed July 28, 1916, Serial No. 111,802. Divided and this application filed November 24, 1916. Serial No. 133,132.

*To all whom it may concern:*

Be it known that I, IWAN OSTROMISLENSKY, a subject of the Czar of Russia, residing at Petrograd, Russia, have invented certain new and useful Improvements in Processes for Vulcanizing Rubber and Products Obtained Thereby, of which the following is a full, clear, and exact description.

This invention relates to processes for vulcanizing and coloring rubber or similar material—such as gutta-percha, balata, synthetic rubber, and materials commonly classed under the term "rubber"—and to the products obtained thereby. It is more particularly directed to a process of the kind mentioned in which the use of sulfur as the vulcanizing ingredient is obviated, the sulfur being replaced in whole or in part by a combined coloring and vulcanizing agent; and to the products resulting therefrom.

Sulfur usually produces a black or dark colored product and it is necessary in order to produce other colors to add organic dyes or other coloring material to the rubber, the majority of which under the usual conditions tend to change and provide undesirable colors. Further, articles vulcanized by sulfur age somewhat rapidly, and unavoidable excess of sulfur sometimes occurs in the articles to the detriment thereof, for example the life of the article is shortened, to remedy which a supplementary process of airing must be resorted to which lengthens the process of cure.

The principal object of the present invention accordingly is to provide a simple and efficient process for coloring and vulcanizing rubber which by obviating the use of sulfur as the vulcanizing agent shall do away with the disadvantages noted in the use thereof, while obtaining important advantages in the vulcanized product. Another object is to provide a series of products having a wide range of desirable physical characteristics and particularly having a wide range of color employing a combined coloring and vulcanizing agent or agents other than sulfur or sulfur compounds.

This is a division of my application, Serial No. 111,802, filed July 28, 1916.

Briefly stated, I accomplish the objects noted by subjecting the rubber or similar material to the action of a dye serving as a vulcanizing agent, preferably in the absence of sulfur, whereby various types of vulcanized rubber usually obtainable with sulfur may be produced.

In carrying out the process in one of its preferred forms 10 grams of rubber are mixed with 2 grams of aurotin tetranitrophenolpthalein, which is a tetranitro-triphenylmethane derivative of the pthaleine group, which is an organic nitrocompound dye, 0.1 gram of naphthylamin and 2 grams of lead oxid. The mixing process is carried on in an ordinary mill preferably at the usual temperature although any desired temperature may be employed. The mixture is placed in a metal mold and heated by the application of steam of a pressure of approximately 45 pounds for a period of 45–70 minutes under the pressure of the vulcanizing press, at the end of which period vulcanization is complete. Or the mixture may be subjected to an open-heat cure or to any well-known procedure carried on in vulcanizing as heretofore practised with sulfur.

The product resulting from the above process possesses in general the desirable physical characteristics set forth in the objects before stated and possesses a high tensile strength. The rubber produced is soft and is generally applicable where soft rubbers produced by sulfur vulcanization have been used. Its color is reddish brown. It is especially resistant to aging not only under normal temperature but also when heated and thus finds a particular application for use in packing, steam hose, and in all cases where the vulcanized rubber must withstand the action of heat in use.

According to my theory the action of aurotin in effecting vulcanization is secured through the activity of one or more of the oxygen atoms of the nitro-groups thereof, and it has been found that other dyes having the nitro-group possess this property—for example aurantica (hexanitrodiphenylamin):

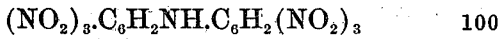

$$(NO_2)_3 . C_6 H_2 NH . C_6 H_2 (NO_2)_3$$

It will be furthermore noted that naphthylamin mentioned above is particularly useful in preventing aging, and in the presence of a metallic oxid such as one of the class mentioned below possesses also an accelerating power. Anilin, naphthylamin, mentioned above, pyridin, piperidin, diisoamylamin, operate in substantially the same manner.

The effect produced by the amins mentioned may be simulated by the use of very small traces (.05%) of sulfur, antimony, or substances having an alkaline reaction, as for instance, sodium alcoholate, and the like.

Lead oxid also provides a highly efficient accelerating action and in this capacity is a representative of a class of substances which act similarly in a greater or less degree. This class includes zinc oxid, calcium oxid, magnesium oxid, barium oxid.

It will be observed furthermore that the process of application of the dyes and other materials may be carried out under substantially all of the various conditions now in use for vulcanization by means of sulfur. The material, for example, may be immersed in a fused dye or solutions of dyes in various solvents may be added to various rubber solutions. The apparatus used may also be any of the well-known types employed in processes using sulfur.

It will be observed that the process above recited is not only applicable to natural rubber but may also be carried out in connection with the various artificial rubbers, synthetic rubbers, and similar substances as normal isoprene and erythrene india rubber, dimethylerythrene, etc.

As many apparently widely different embodiments of this invention could be made without departing from the spirit thereof, it is to be understood that I do not intend to limit myself to the specific form of the invention as set forth except as indicated in the appended claims.

Having thus described my invention what I claim and desire to protect by Letters Patent is:

1. A process for treating rubber or similar material which comprises subjecting the rubber to an organic dye adapted to produce oxygen and inducing vulcanization to take place under the action of said oxygen.

2. A process for treating rubber or similar material which comprises subjecting the rubber to a dye containing oxygen and nitrogen and causing vulcanization to take place under the action thereof.

3. A process for treating rubber or similar material which comprises adding an organic dye containing a nitro-group to said rubber and vulcanizing said rubber under the action of said dye.

4. A process for treating rubber or similar material which comprises subjecting the rubber to a vulcanizing coloring agent containing oxygen in the presence of an accelerating agent and inducing vulcanization to take place under the action thereof.

5. A process for treating rubber or similar material which comprises subjecting the rubber to a vulcanizing dye containing oxygen in the presence of metallic oxid and inducing vulcanization to take place under the action thereof.

6. A process for treating rubber or similar material which comprises subjecting the rubber to a vulcanizing coloring agent containing oxygen in the presence of anti-aging material, and inducing vulcanization to take place under the action thereof.

7. A process for treating rubber or similar material which comprises subjecting the rubber to a vulcanizing dye containing oxygen in the presence of an amin, and inducing vulcanization to take place under the action thereof.

8. A process for treating rubber or similar material which comprises subjecting the rubber to a vulcanizing dye containing oxygen in the presence of an anti-aging material and an accelerator, and inducing vulcanization to take place under the action thereof.

9. A process for treating rubber or similar material which comprises subjecting the rubber to a vulcanizing dye containing oxygen in the presence of lead oxid and naphthylamin, and inducing vulcanization to take place under the action thereof.

10. As a new compound a vulcanized rubber containing products of the action of an organic vulcanizing coloring agent.

11. As a new compound a vulcanized rubber containing products of the action of a vulcanizing coloring agent comprising oxygen and nitrogen.

12. As a new compound a vulcanized rubber comprising products of the action of a vulcanizing agent including an organic dye containing a nitro-group.

13. As a new compound a vulcanized rubber comprising products of the action of an accelerating agent and a vulcanizing coloring agent containing oxygen.

14. As a new compound a vulcanized rubber comprising products of the action of a metallic oxid and a vulcanizing coloring agent containing oxygen.

15. As a new compound a vulcanized rubber comprising products of the action of an anti-aging material and a vulcanizing coloring agent containing oxygen.

16. As a new compound a vulcanized rubber comprising products of the action of an amin and a vulcanizing coloring agent containing oxygen.

17. As a new compound a vulcanized rubber comprising products of the action of lead oxid, naphthylamin and a dye containing a nitro-group.

Signed at Petrograd, Russia this 17 day of November 1916.

IWAN OSTROMISLENSKY.